(12) United States Patent
Padmanabhan et al.

(10) Patent No.: US 11,232,284 B2
(45) Date of Patent: Jan. 25, 2022

(54) TECHNIQUES FOR ROBUST ANTI-SPOOFING IN BIOMETRICS USING POLARIZATION CUES FOR NIR AND VISIBLE WAVELENGTH BAND

(71) Applicant: OMNIVISION TECHNOLOGIES, INC., Santa Clara, CA (US)

(72) Inventors: Badrinath Padmanabhan, San Jose, CA (US); Yiyi Ren, San Jose, CA (US); Wenshou Chen, Santa Clara, CA (US); Richard Mann, Santa Clara, CA (US); Alireza Bonakdar, San Jose, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 97 days.

(21) Appl. No.: 16/729,001

(22) Filed: Dec. 27, 2019

(65) Prior Publication Data
US 2021/0200992 A1    Jul. 1, 2021

(51) Int. Cl.
*G06K 9/00* (2006.01)
*G06N 20/00* (2019.01)
(Continued)

(52) U.S. Cl.
CPC ......... *G06K 9/00268* (2013.01); *G06F 21/32* (2013.01); *G06K 9/00234* (2013.01);
(Continued)

(58) Field of Classification Search
CPC ........... G06K 9/00268; G06K 9/00302; G06K 9/00335; G06K 9/6232; G06K 9/4628; G06K 9/6274; G06K 9/00281; G06K 9/00288; G06K 9/00255; G06K 9/00926; G06K 2009/00932; G06K 9/00026; G06K 9/6255; G06K 9/00577; G06K 9/00892; G06K 9/00979; G06K 9/627; G06K 2009/00738; G06K 9/00006; G06K 9/00617; G06K 9/00711; G06K 9/00771; G06K 9/00087; G06K 9/00369; G06K 9/00718; G06K 9/3233; G06K 9/6218; G06K 9/6262; G06K 9/00295;
(Continued)

(56) References Cited

U.S. PATENT DOCUMENTS

| 2002/0145507 A1* | 10/2002 | Foster ............... G07C 9/00563 340/5.53 |
| 2013/0234029 A1* | 9/2013 | Bikumandla ....... H01L 27/1464 250/349 |

(Continued)

*Primary Examiner* — Nimesh Patel
(74) *Attorney, Agent, or Firm* — Christensen O'Connor Johnson Kindness PLLC

(57) ABSTRACT

A system comprising a polarization CMOS image sensor, at least one processor and a non-transitory computer-readable medium having computer-executable instructions stored thereon that, in response to execution by the at least one processor, cause the system to perform actions including receiving, from the polarization CMOS image sensor, polarization information and two-dimensional image information. The polarization information is processed using a machine learning model to generate an output that indicates whether the polarization information represents a valid biometric measurement of a physical feature of a subject.

18 Claims, 8 Drawing Sheets

(51) Int. Cl.
  *G06K 9/62* (2006.01)
  *G06F 21/32* (2013.01)

(52) U.S. Cl.
  CPC ....... *G06K 9/00248* (2013.01); *G06K 9/6256* (2013.01); *G06N 20/00* (2019.01)

(58) Field of Classification Search
  CPC .. G06K 9/6256; G06K 9/6215; G06K 9/6277; G06N 3/08; G06F 21/32; G06F 21/31; G06F 21/6245; G06F 2221/2113; G06F 2221/2149; G06F 21/606; H04L 12/282; H04L 63/0853; H04L 63/0861; H04L 41/28; H04L 63/00; H04L 63/0407; H04L 9/3231; H04L 2463/082; H04L 63/105; H04L 63/107; H04W 12/06; H04W 12/68; H04W 12/068; H04W 12/80; H04W 4/021; H04W 4/029; H04W 4/90
  See application file for complete search history.

(56) References Cited

U.S. PATENT DOCUMENTS

| | | | |
|---|---|---|---|
| 2015/0244916 A1* | 8/2015 | Kang | H04N 5/2355 |
| | | | 348/222.1 |
| 2017/0091548 A1* | 3/2017 | Agrawal | G06K 9/209 |
| 2017/0372505 A1* | 12/2017 | Bhat | G06T 7/11 |
| 2018/0053364 A1* | 2/2018 | Bhattacharya | G07C 9/00563 |
| 2019/0156117 A1* | 5/2019 | Minagawa | G06F 21/556 |
| 2019/0392189 A1* | 12/2019 | Kumar | G06K 9/4628 |
| 2020/0057902 A1* | 2/2020 | Kim | G06K 9/00013 |
| 2021/0074751 A1* | 3/2021 | Bonakdar | H01L 27/14685 |
| 2021/0118931 A1* | 4/2021 | Matsunuma | G02B 5/30 |

\* cited by examiner

TECHNIQUES FOR ROBUST ANTI-SPOOFING IN BIOMETRICS USING POLARIZATION CUES FOR NIR AND VISIBLE WAVELENGTH BAND

BACKGROUND INFORMATION

Field of the Disclosure

This disclosure relates generally to biometrics, and in particular but not exclusively, relates to biometrics used for user authentication.

Background Information

Biometric measurements are being used increasingly for user authentication. For example, facial recognition is increasingly being used to authenticate access to devices, including but not limited to smartphone devices.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified. To easily identify the discussion of any particular element or act, the most significant digit or digits in a reference number refer to the figure number in which that element is first introduced.

Figure 1:
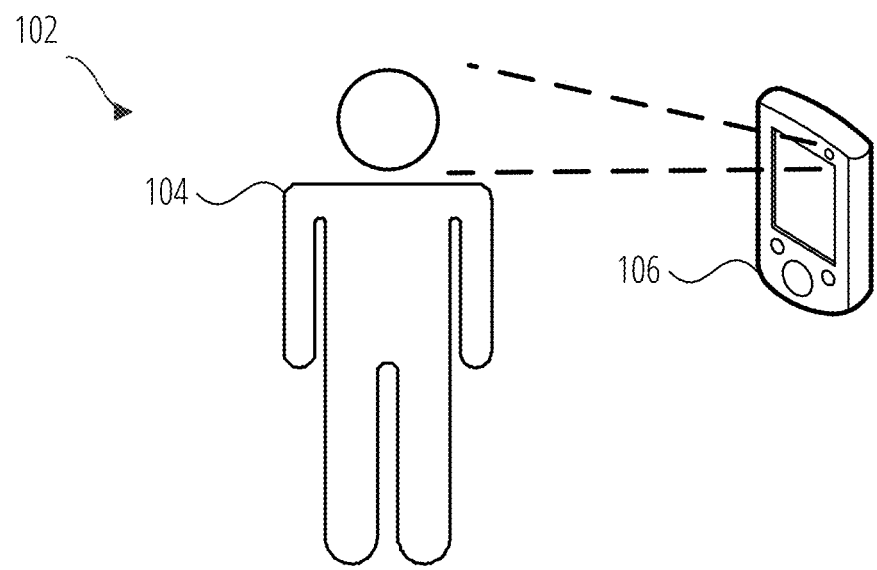
FIG. 1 is a schematic drawing that illustrates a first example and a second example of uses of facial recognition for user authentication.
Figure 1:
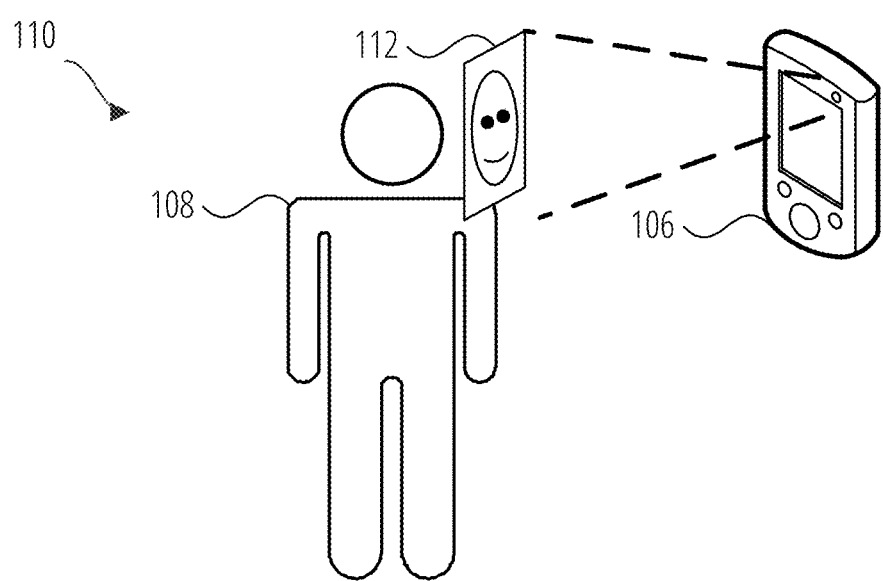

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Systems and methods directed to biometric measurements of physical features of a subject are disclosed. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example and embodiment. Furthermore, the particular features, structures, or characteristics may be combined in any suitable manner in one or more examples and embodiments.

Throughout this specification, several terms of art are used. These terms are to take on their ordinary meaning in the art from which they come, unless specifically defined herein or the context of their use would clearly suggest otherwise.

FIG. 1 is a schematic drawing that illustrates a first example and a second example of uses of facial recognition for user authentication. The first example 102 shows a simple case, where a device 106 such as a smartphone uses a sensor to capture an image of a subject 104. A facial recognition analysis may then be performed on the image in order to authenticate the subject 104.

Traditionally, facial recognition systems use a two-dimensional image sensor to obtain a two-dimensional image on which a facial recognition analysis will be performed to verify the identity of the user, and a three-dimensional sensor (such as a time-of-flight sensor, a stereo imaging sensor, or an active stereo/structured light sensor) is used to obtain information for anti-spoofing. That is, the three-dimensional sensor information is used to ensure that the two-dimensional image is of an actual face, and is not merely a photograph or other spoofed depiction of the user. The second example 110 illustrates a situation in which such a technique would be desirable: instead of the subject 104, a malicious user 108 is presenting a spoofed depiction 112 of the subject 104 to the sensor of the device 106. In traditional facial recognition systems, the spoofed depiction 112 may be able to fool the device 106 if three-dimensional sensor information is not collected.

However, there are drawbacks to requiring three-dimensional sensor information for avoiding spoofing of facial recognition data. For example, using three-dimensional information for anti-spoofing naturally requires including a three-dimensional sensor within the device 106. This increases the complexity and cost of the device 106. As another example, the point cloud generation that occurs when processing three-dimensional sensor data increases computation costs many-fold. As yet another example, when machine learning models such as convolutional neural networks (CNNs) are used for the facial recognition analysis, the amount of data used for training the CNN on the three-dimensional sensor information is very large. What is desired are techniques for detecting spoofing without using a three-dimensional sensor.

One example of a technique that may be used to eliminate the three-dimensional sensor is the use of a polarization sensor that is incorporated into an image sensor. The polarization CMOS image sensor described therein augments a traditional image sensor with the ability to generate polarization data, including angle of linear polarization (AoLP) information and degree of linear polarization (DoLP) information associated with the pixels of the corresponding two-dimensional image.

Surface reflections from an object change the polarization of light reflected therefrom. By detecting the AoLP information and DoLP information, a set of surface normals can be extracted, and a surface shape can then be extracted therefrom. This surface shape can then be used for anti-spoofing processing. This technique is preferable to using a separate three-dimensional sensor, at least because a separate sensor is not needed, and also because generating the two-dimensional image information and the polarization information with a single sensor eliminates registration issues that arise when trying to align the information generated by separate sensors. However, the problems with computational complexity persist if the polarization information is used to create a three-dimensional representation of the subject. What is desired are techniques that can use the polarization information generated by a polarization CMOS image sensor directly to provide anti-spoofing functionality without having to generate a three-dimensional representation of the subject.

Figure 2:
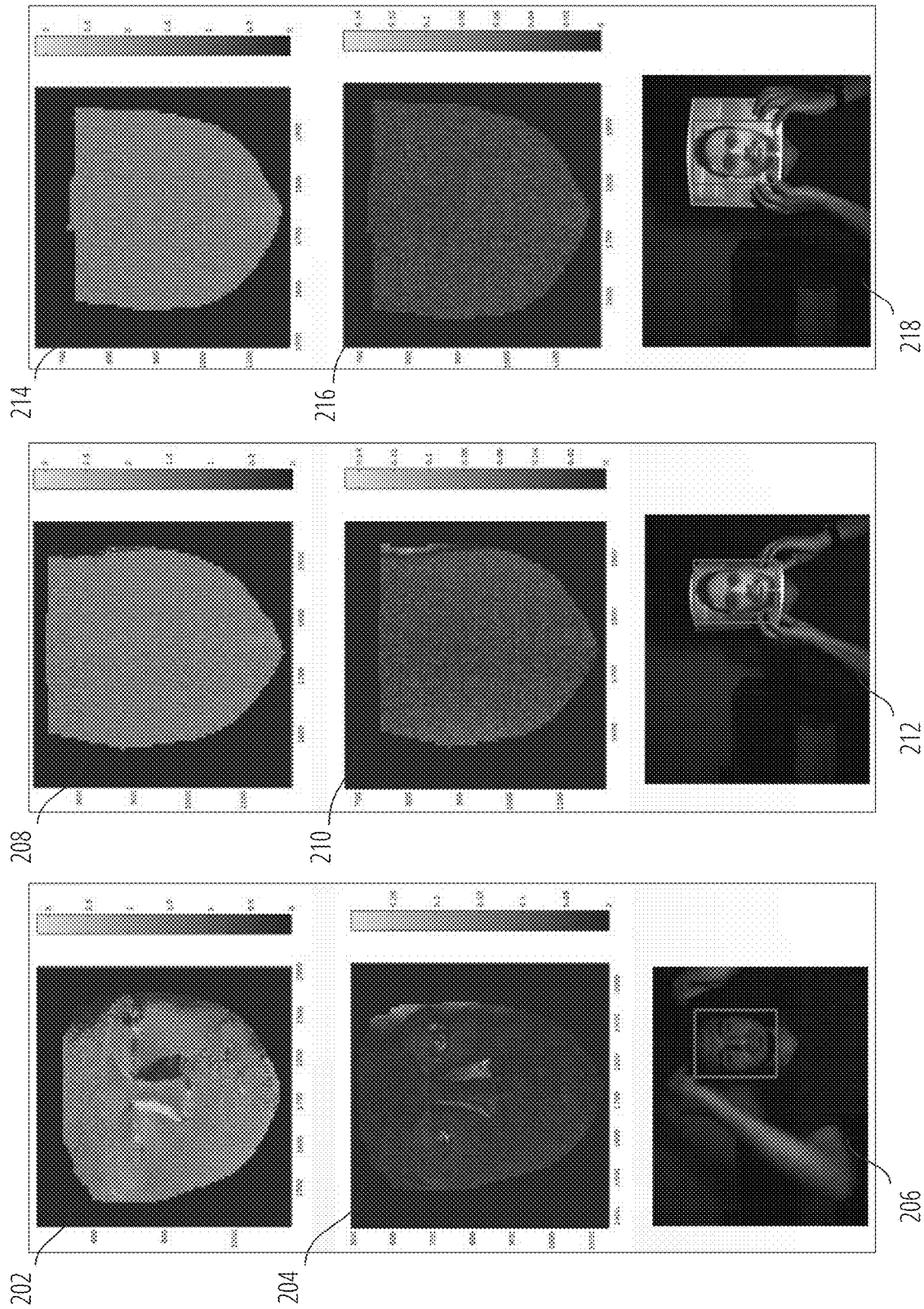
FIG. 2 illustrates non-limiting examples of information collected by a polarization CMOS image sensor in various embodiments of the present disclosure.

FIG. 2 illustrates non-limiting examples of information collected by a polarization CMOS image sensor in various embodiments of the present disclosure. The examples shown in FIG. 2 illustrate types of information that may be collected and processed by embodiments of the present disclosure in order to detect spoofing and to perform biometric measurements.

A first column of FIG. 2 illustrates information collected by a polarization CMOS image sensor from a real face, including AoLP information of a real face 202, DoLP information of a real face 204, and a two-dimensional image of a real face 206. As can be seen, the two-dimensional image of a real face 206 depicts the subject in a format from which a facial recognition analysis may be performed, and the AoLP information of a real face 202 and the DoLP information of a real face 204, though not providing a complete three-dimensional reconstruction of the face of the subject, do provide information that indicates a facial structure is present. As illustrated, the AoLP information and DoLP information is limited to the face region within the rectangle of the two-dimensional image in which a face was detected.

A second column of FIG. 2 illustrates information collected by a polarization CMOS image sensor from a first spoofed face, including AoLP information of a first spoofed face 208, DoLP information of a first spoofed face 210, and a two-dimensional image of a first spoofed face 212. The first spoofed face is a photograph of the face of the subject that is bent around the face of a different subject. As can be seen in the two-dimensional image of a first spoofed face 212, the two-dimensional image by itself appears similar to the two-dimensional image of a real face 206, and could fool a facial recognition analysis that is using the two-dimensional image alone. However, the AoLP information of a first spoofed face 208, and the DoLP information of a first spoofed face 210 show a lack of texture compared to the AoLP information of a real face 202 and DoLP information of a real face 204, and indicate that the image is being spoofed.

A third column of FIG. 2 illustrates information collected by a polarization CMOS sensor from a second spoofed face, including AoLP information of a second spoofed face 214, DoLP information of a second spoofed face 216, and a two-dimensional image of a second spoofed face 218. The second spoofed face is a photograph of the face of the subject that is held flat with respect to the polarization CMOS image sensor. While the two-dimensional image in the two-dimensional image of a second spoofed face 218 may be even more likely to fool a facial recognition analysis, the AoLP information of a second spoofed face 214 and the DoLP information of a second spoofed face 216 clearly show the lack of texture information.

Figure 3:
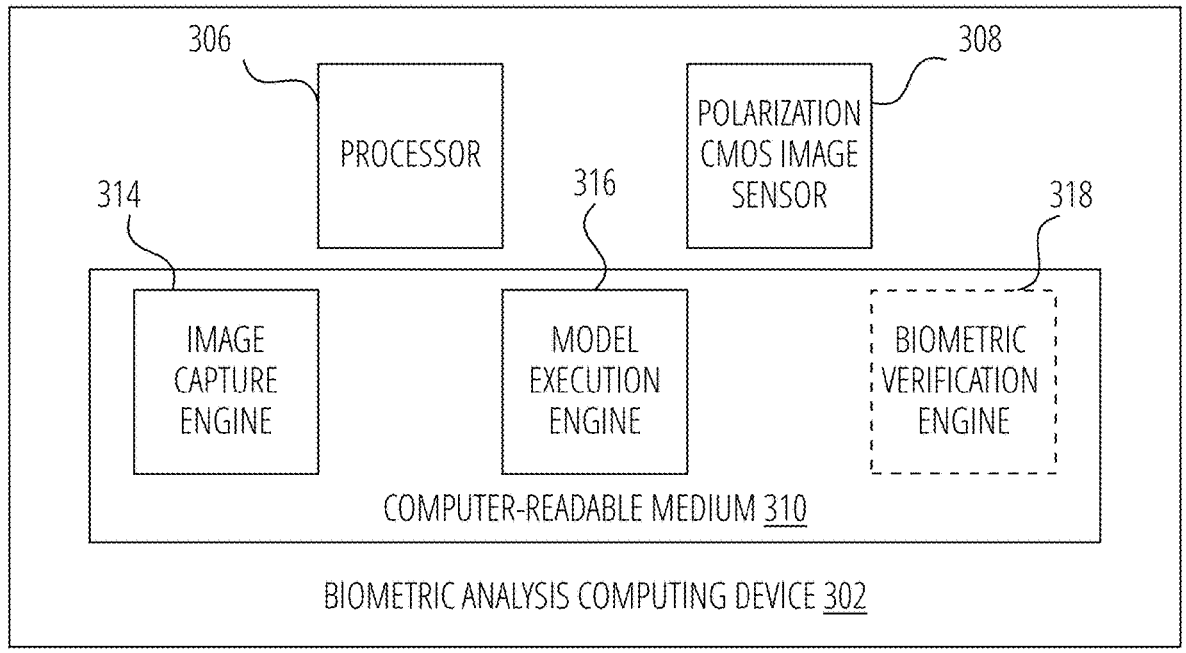
FIG. 3 is a block diagram that illustrates non-limiting example embodiments of a biometric analysis computing device and a model training computing device according to various aspects of the present disclosure.
Figure 3:
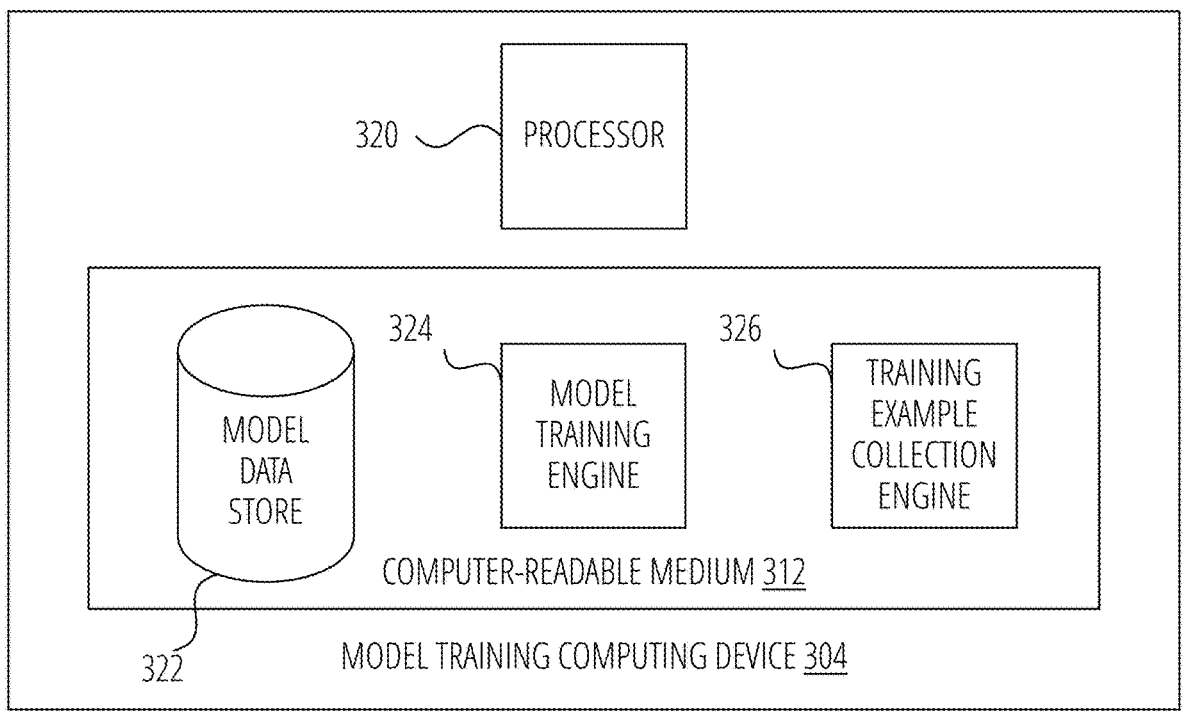

FIG. 3 is a block diagram that illustrates non-limiting example embodiments of a biometric analysis computing device and a model training computing device according to various aspects of the present disclosure. In some embodiments, the biometric analysis computing device 302 is used to capture images of a subject that includes two-dimensional image information and polarization information. Such images are then used by the model training computing device 304 to train at least one machine learning model to detect spoofing in a biometric measurement, and, in some embodiments, to perform the biometric measurement. The trained machine learning model is then provided to the biometric analysis computing device 302 so that the biometric analysis computing device 302 may use it to perform spoof-resistant biometric analyses.

In some embodiments, the biometric analysis computing device 302 and the model training computing device 304 may exchange images, training examples, machine learning models, and/or any other information via any suitable communication technique, including wireless communication techniques (including but not limited to 2G, 3G, 4G, 5G, LTE, Wi-Fi, WiMAX, and Bluetooth), wired communication techniques (including but not limited to Ethernet, USB, and FireWire), or media-swapping communication techniques (including but not limited to transferring a removable computer-readable medium between the biometric analysis computing device 302 and the model training computing device 304).

In some embodiments, the biometric analysis computing device 302 is a mobile computing device such as a smartphone or a tablet computing device. In some embodiments, any other type of computing device that includes the illustrated components, including but not limited to a laptop computing device or a desktop computing device, may be used as a biometric analysis computing device 302. In some embodiments, the functionality of the biometric analysis computing device 302 may be split between multiple computing devices. For example, a device such as an external camera device may provide the polarization CMOS image sensor 308, and a host computing device such as a desktop computing device or a server computing device that is communicatively coupled to the external camera device may provide the remainder of the components of the biometric analysis computing device 302.

As shown, the biometric analysis computing device 302 includes at least one processor 306, a polarization CMOS image sensor 308, and a computer-readable medium 310. In some embodiments, the processor 306 may include multiple processing cores, such that the processor 306 is capable of performing multiple tasks in parallel. In some embodiments, at least one processor 306 may include multiple processors, including one or more processors tuned for specific purposes, including but not limited to processing graphics-related tasks, processing machine learning-related tasks, or processing biometric analysis tasks.

In some embodiments, the polarization CMOS image sensor 308 includes a grid of pixels. In some embodiments, each pixel includes a photodiode, a polarizer, and a micro lens. The photodiodes are configured to capture a traditional two-dimensional image. The polarizers are arranged in one of four different wire-grid directions (zero degrees, 45 degrees, 90 degrees, and 135 degrees) in order to measure polarization at different angles. In some embodiments, only three of these four degrees may be present.

The DoLP and AoLP for the pixels can then be measured as follows:

$$S_0 = \text{Intensity} = I_{tot}$$
$$S_0 = I_{0°} + I_{90°}$$
$$S_1 = I_{0°} - I_{90°}$$
$$S_2 = I_{45°} - I_{135°}$$
$$DoLP = \frac{\sqrt{S_1^2 + S_2^2}}{S_0}, DoLP \in [0, 1]$$
$$AoLP = \frac{1}{2} \arc\tan\left(\frac{S_2}{S_1}\right), AoLP \in [0°, 180°]$$

As shown, the computer-readable medium 310 includes an image capture engine 314, a model execution engine 316, and an optional biometric verification engine 318. In some embodiments, the image capture engine 314 is configured to use the polarization CMOS image sensor 308 to capture images that include two-dimensional image information and polarization information. The image capture engine 314 may then provide the images to other components of the biometric analysis computing device 302 or the model training computing device 304 for processing. In some embodiments, the model execution engine 316 is configured to process the images captured by the image capture engine 314 using a machine learning model trained by the model training computing device 304 and transmitted to the biometric analysis computing device 302. In some embodiments, the biometric verification engine 318 is configured to perform a biometric verification on the two-dimensional image information included in the image, once the machine learning model is used to determine whether the subject is being spoofed in the image. The biometric verification engine 318 is illustrated as being optional because, in some embodiments, the machine learning model may be trained to perform both anti-spoofing and biometric verification.

In some embodiments, the model training computing device 304 is a desktop computing device, a server computing device, one or more computing devices of a cloud computing system, or any other suitable type of computing device that includes the illustrated components.

As shown, the model training computing device 304 includes at least one processor 320 and a computer-readable medium 310. As with the processor 306, the processor 320 may include multiple cores, and/or may include more than one processor that is optimized for a particular task. The computer-readable medium 312 includes a model data store 322, a model training engine 324, and a training example collection engine 326. In some embodiments, the model data store 322 is configured to store one or more machine learning models generated by the model training engine 324. In some embodiments, the model data store 322 may also store sets of training examples. In some embodiments, the model training engine 324 is configured to train machine learning models to detect spoofing, and/or to both detect spoofing and perform biometric verification. In some embodiments, the training example collection engine 326 is configured to receive images from the biometric analysis computing device 302 (or more than one biometric analysis computing device 302) in order to create training examples to be used by the model training engine 324 to train machine learning models.

The illustrated distribution of components between the biometric analysis computing device 302 and the model training computing device 304 is an example only. In some embodiments, some of the components illustrated as being present on the model training computing device 304 may be present instead on the biometric analysis computing device 302, and vice versa. In some embodiments, the biometric analysis computing device 302 and the model training computing device 304 may be combined into a single computing device. In some embodiments, the functionality of one or both of the biometric analysis computing device 302 and the model training computing device 304 may be split to be provided by multiple computing devices instead of single computing devices.

As used herein, the term "engine" refers to logic embodied in hardware or software instructions, which can be written in a programming language, such as C, C++, COBOL, JAVA™ PHP, Perl, HTML, CSS, JavaScript, VBScript, ASPX, Microsoft .NET™, Go, Python, and/or the like. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

As used herein, the term "data store" refers to any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

As used herein, the term "computer-readable medium" refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage.

Figure 4:
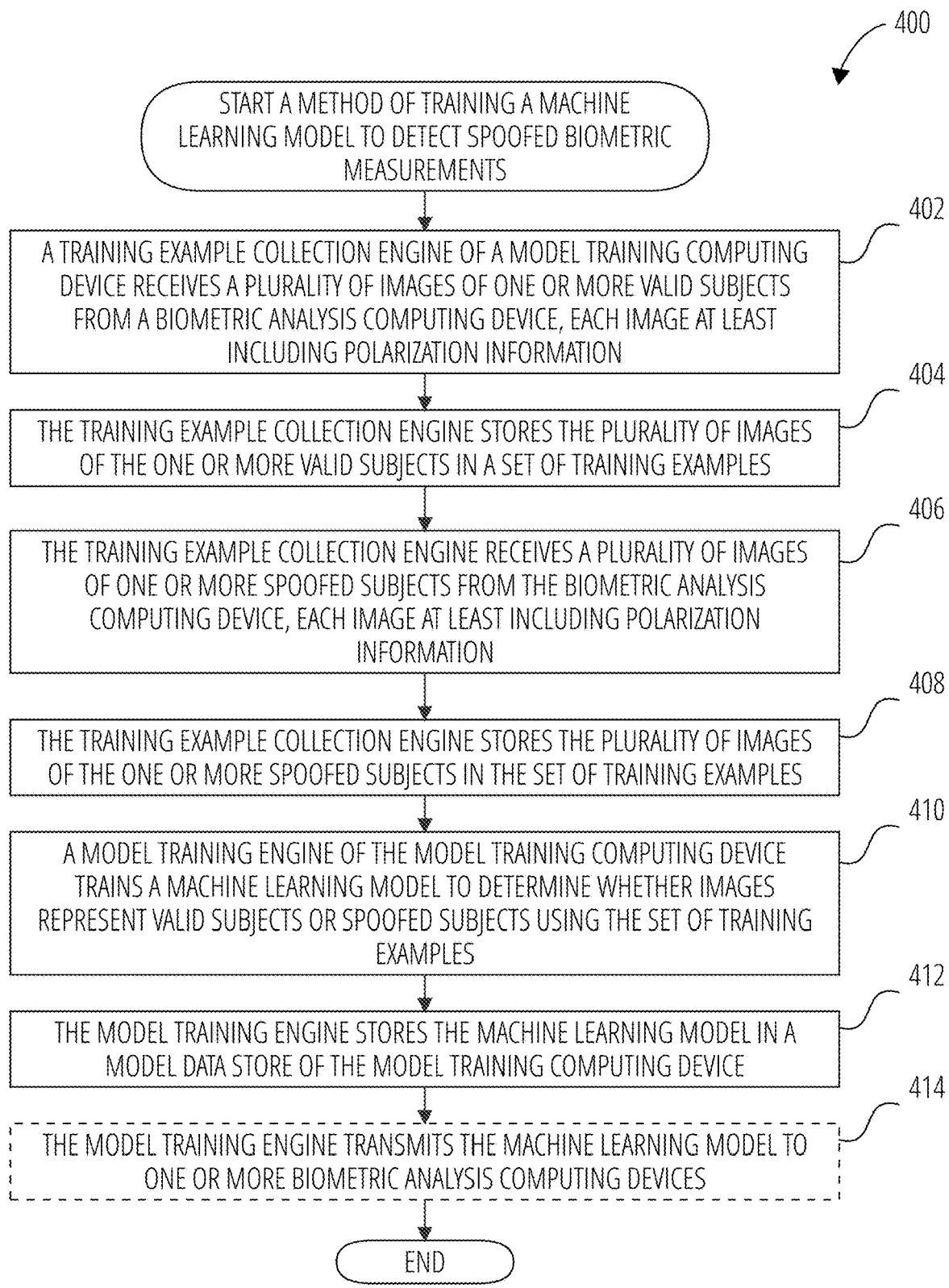
FIG. 4 is a flowchart that illustrates a non-limiting example embodiment of a method of training a machine learning model to detect spoofed biometric measurements according to various aspects of the present disclosure.

FIG. 4 is a flowchart that illustrates a non-limiting example embodiment of a method of training a machine learning model to detect spoofed biometric measurements according to various aspects of the present disclosure. The method 400 illustrated in FIG. 4 trains a machine learning model to detect images that contain spoofed biometric measurements using the polarization information generated by a polarization CMOS image sensor 308. For a biometric analysis computing device 302 that uses a machine learning model produced using this method 400, a separate technique will be used to perform the biometric measurement in addition to the spoofing detection performed using the machine learning model.

From a start block, the method 400 proceeds to block 402, where a training example collection engine 326 of a model training computing device 304 receives a plurality of images of one or more valid subjects from a biometric analysis computing device 302, each image at least including polarization information. A "valid subject" is a subject of a biometric measurement that is not being spoofed. For example, an image may be captured of a real face, a real fingerprint, a real palm print, a real iris, or any other target of a biometric analysis. In some embodiments, the polarization information includes AoLP information and DoLP information as discussed above. In some embodiments, the polarization information may include just one of the AoLP information or the DoLP information. In some embodiments, the polarization information may include the $S_0$, $S_1$, and $S_2$ information. In some embodiments, the polarization information may include surface normal information. In some embodiments, the plurality of images may be of multiple different valid subjects. In some embodiments, the plurality of images may include multiple images of the same valid subject.

At block 404, the training example collection engine 326 stores the plurality of images of the one or more valid subjects in a set of training examples. The set of training examples may be stored in the model data store 322, or another data store. In some embodiments, the images of the one or more valid subjects may be stored in the set of training examples along with an indication that the images are valid/not spoofed. In some embodiments, the training example collection engine 326 may detect a location of a face (or other feature to be measured) in the image, and may limit the stored information to the location of the face in order to reduce processing and storage costs.

At block 406, the training example collection engine 326 receives a plurality of images of one or more spoofed subjects from the biometric analysis computing device 302, each image at least including polarization information. The types of polarization information are similar to the polarization information collected in block 402. A "spoofed subject" is an attempt to appear to be a valid subject of a biometric measurement, when in reality the valid subject is not present. One example of a spoofed subject is a photograph of a valid subject that is presented to the polarization CMOS image sensor 308 instead of the valid subject, though other types of spoofed subjects may be used. As with the valid training examples collected in block 402, training examples may be collected from different spoofed subjects, and/or multiple training examples may be collected from the same spoofed subject.

At block 408, the training example collection engine 326 stores the plurality of images of the one or more spoofed subjects in the set of training examples. Again, the images of the one or more spoofed subjects may be stored in the set of training examples along with an indication that the images are not valid/are spoofed. Also, the training example collection engine 326 may detect a location of a face in the image, and may limit the stored information to the location of the face in order to reduce processing and storage costs.

At block 410, a model training engine 324 of the model training computing device 304 trains a machine learning model to determine whether images represent valid subjects or spoofed subjects using the set of training examples. Any suitable type of machine learning model or combinations of types of models may be used, including but not limited to a support vector machine (SVM), a decision tree, or a convolutional neural network. Further, any suitable technique or combinations of techniques may be used to train the machine learning model, including but not limited to gradient descent and backpropagation. The inputs to the machine learning model are the polarization information stored in the training examples, and the spoofed/valid indications are used as the expected output values. In some embodiments, the trained machine learning model accepts polarization information as an input, and generates an output that indicates whether the polarization information represents a valid subject or a spoofed subject. In some embodiments, the output is a binary value. In some embodiments, the output is a confidence value or other percentage that may then be compared to a confidence threshold in order to determine whether the polarization information represents a valid subject or a spoofed subject.

At block 412, the model training engine 324 stores the machine learning model in a model data store 322 of the model training computing device 304. At optional block 414, the model training engine 324 transmits the machine learning model to one or more biometric analysis computing devices 302. Optional block 414 is illustrated as optional because in some embodiments, the biometric analysis computing device 302 may obtain the machine learning model using some other technique, or the machine learning model may be retained on the model training computing device 304 in order to perform analyses on the model training computing device 304.

The method 400 then proceeds to an end block and terminates. One will note that the order in which the blocks of method 400 are illustrated is an example only, and that in some embodiments, some of the blocks may be executed in a different order, or in parallel. For example, in some embodiments, the actions described with respect to blocks 402 and 404 may occur after or concurrently with the actions described with respect to blocks 406 and 408.

Figure 5:
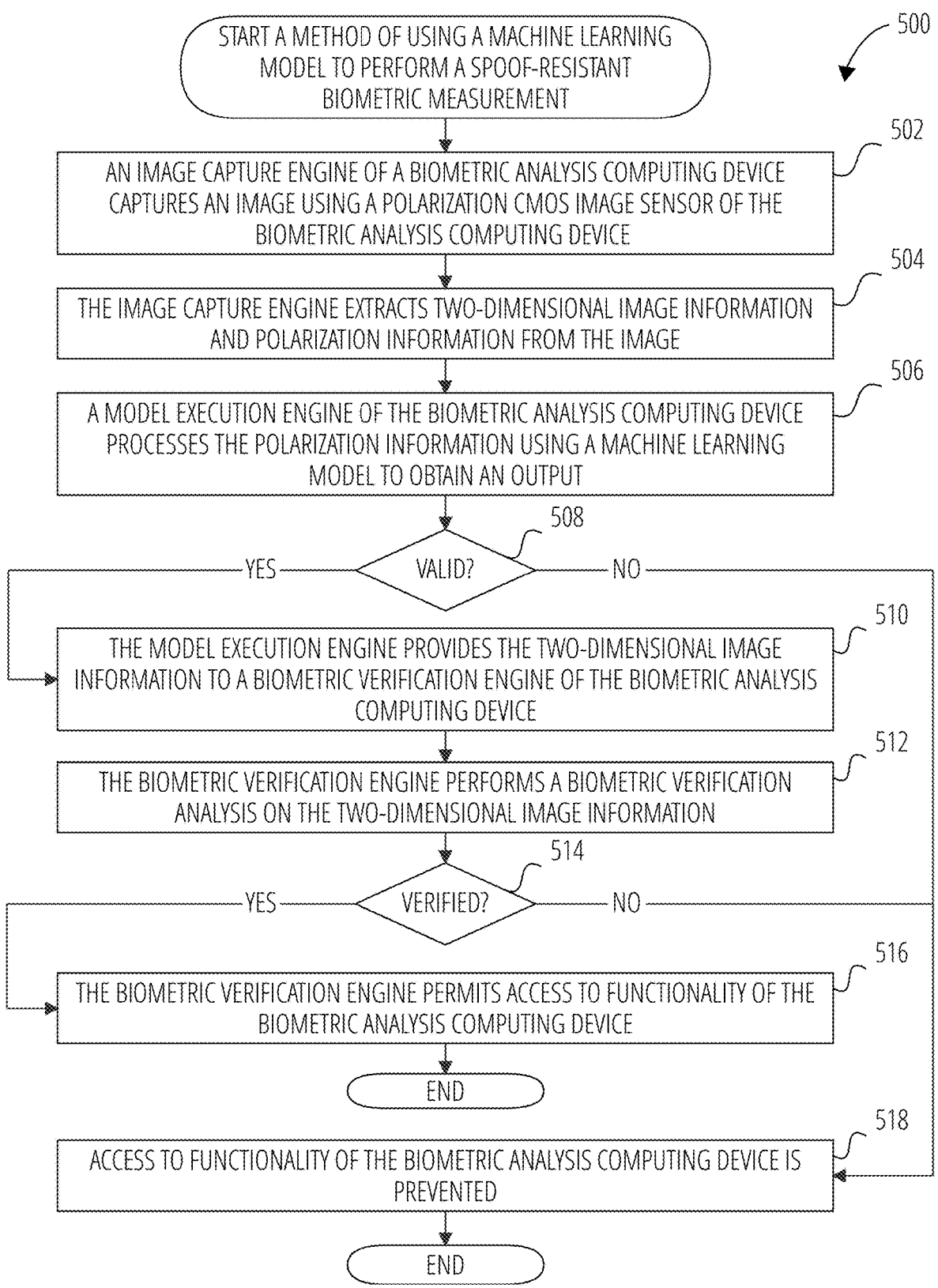
FIG. 5 is a flowchart that illustrates a non-limiting example embodiment of a method of using a machine learning model to perform a spoof-resistant biometric assessment according to various aspects of the present disclosure.

FIG. 5 is a flowchart that illustrates a non-limiting example embodiment of a method of using a machine learning model to perform a spoof-resistant biometric assessment according to various aspects of the present disclosure. The method 500 uses a machine learning model such as the machine learning model trained in method 400 as discussed above.

In general, the method 500 uses a biometric analysis computing device 302 that includes a biometric verification engine 318. The machine learning model is used to determine whether an image represents a spoofed subject or a valid subject, and the biometric verification engine 318 is used to perform the biometric verification analysis upon determining that the subject is valid. The method 500 may be used for any reason a biometric verification may be used. As a non-limiting example, the method 500 may be used to determine whether a user is authorized to access functionality of the biometric analysis computing device 302, such as unlocking the biometric analysis computing device 302 or executing a particular function or application provided by the biometric analysis computing device 302. As another non-limiting example, the method 500 may be used to determine whether a user is authorized to access a restricted area, and the biometric analysis computing device 302 may unlock an access control device to allow the user to access the restricted area if the biometric verification analysis is successful.

From a start block, the method 500 proceeds to block 502, where an image capture engine 314 of a biometric analysis computing device 302 captures an image using a polarization CMOS image sensor 308 of the biometric analysis computing device 302. At block 504, the image capture engine 314 extracts two-dimensional image information and polarization information from the image. As discussed above, the polarization information may include AoLP information and DoLP information, and the polarization information may correspond to the two-dimensional image information. In some embodiments, the polarization information may include just one of the AoLP information or the DoLP information. In some embodiments, the polarization information may include the $S_0$, $S_1$, and $S_2$ information. In some embodiments, the polarization information may include surface normal information. In some embodiments, the image capture engine 314 may detect the presence of a face in the two-dimensional image information, and may limit further processing to the locations within the image that include the face in order to reduce memory and processing cost.

At block 506, a model execution engine 316 of the biometric analysis computing device 302 processes the polarization information using a machine learning model to obtain an output. The machine learning model is a machine learning model such as those trained by method 400 discussed above. The input to the machine learning model is the polarization information (or a portion thereof that corresponds to a detected face or other feature to be measured), and the output of the machine learning model is a Boolean value or a confidence percentage that indicates whether or not the input indicates a valid subject.

The method 500 then advances to a decision block 508, where a determination is made by the biometric analysis computing device 302 regarding whether the output indicates that the image represents a valid biometric measurement. In some embodiments, the determination may simply consider the Boolean value of the output. In some embodiments, the determination may compare the confidence percentage to a threshold percentage to determine whether the subject is valid.

If the determination is that the output indicates that the image does represent a valid biometric measurement, then the result of decision block 508 is YES, and the method 500 advances to block 510. Otherwise, if the determination at decision block 508 determines that the output indicates that the image does not represent a valid biometric measurement, then the result of decision block 508 is NO, and the method 500 advances to block 518.

At block 510, the model execution engine 316 provides the two-dimensional image information to a biometric verification engine 318 of the biometric analysis computing device 302. At block 512, the biometric verification engine 318 performs a biometric verification analysis on the two-dimensional image information. Any suitable biometric verification analysis may be performed. For example, the biometric verification engine 318 may determine biometric markers based on the two-dimensional image, such as facial landmarks, fingerprint landmarks, or iris patterns, and may compare the biometric markers to previously stored biometric markers to determine whether a match exists. Any suitable facial recognition technique, fingerprint recognition technique, iris recognition technique, or other biometric verification analysis may be conducted.

At decision block 514, a determination is made regarding whether the biometric verification analysis verified that the two-dimensional image information represents the expected biometric information. If the determination is that the two-dimensional image information does represent the expected biometric information, then the result of decision block 514 is YES, and the method 500 advances to block 516. Otherwise, if the determination is that the two-dimensional image information does not represent the expected biometric information, then the result of decision block 514 is NO, and the method 500 advances to block 518.

At block 516, the biometric verification engine 318 permits access to functionality of the biometric analysis computing device 302. As stated above, providing access to functionality of the biometric analysis computing device 302 is an example only, and in other embodiments, the action performed at block 516 may be any other desired action that is permitted as a result of a biometric verification analysis. The method 500 then proceeds to an end block and terminates.

At block 518, access to functionality of the biometric analysis computing device 302 is prevented. This could be prevented by the model execution engine 316, the biometric verification engine 318, or by any other component of or associated with the biometric analysis computing device 302. The method 500 then proceeds to an end block and terminates.

Figure 6:
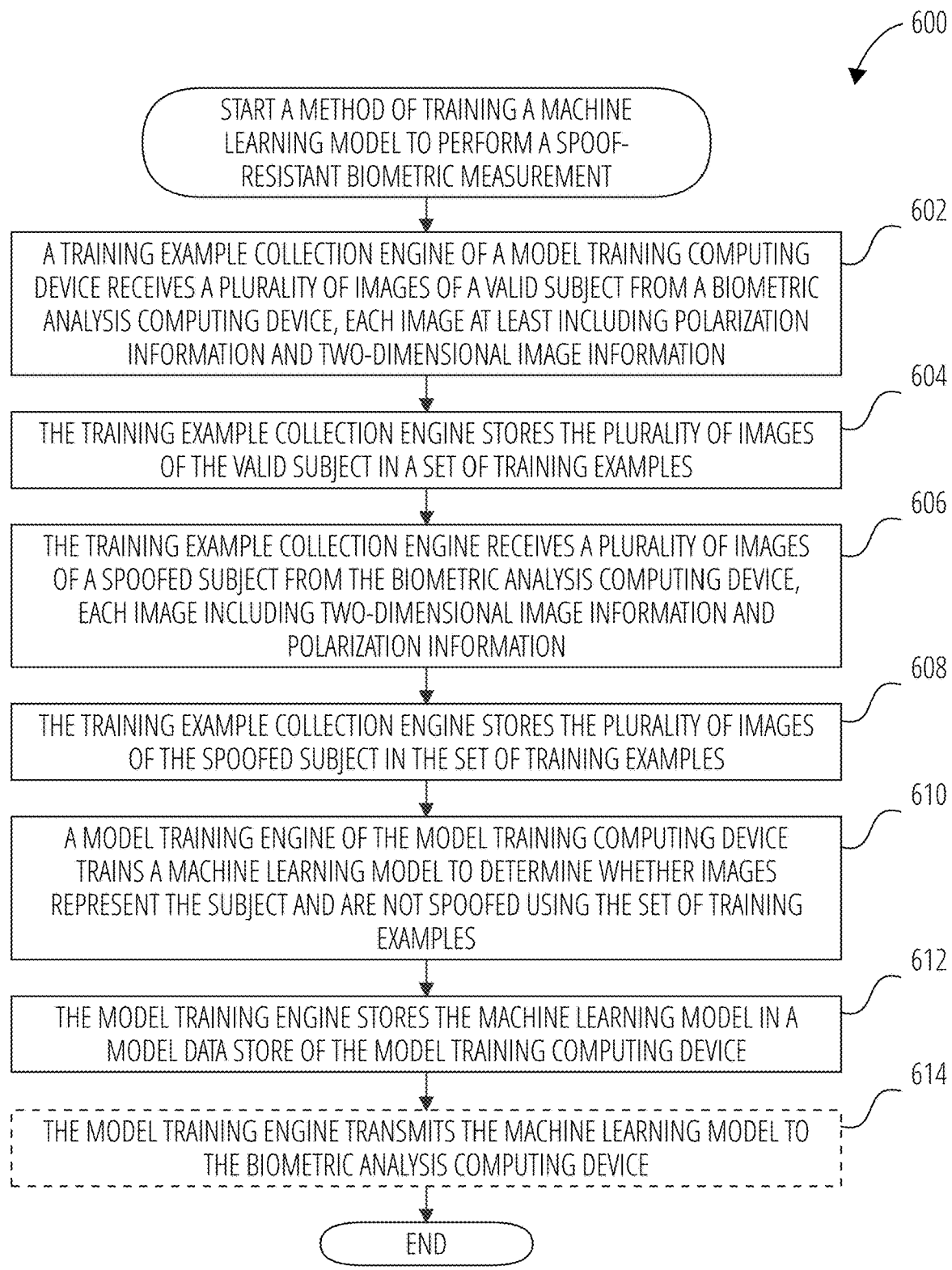
FIG. 6 is a flowchart that illustrates a non-limiting example embodiment of a method of training a machine learning model to perform a spoof-resistant biometric measurement according to various aspects of the present disclosure.

FIG. 6 is a flowchart that illustrates a non-limiting example embodiment of a method of training a machine learning model to perform a spoof-resistant biometric measurement according to various aspects of the present disclosure. The method 600 is similar to the method 400 for training a machine learning model discussed above. However, the method 400 merely trained the machine learning model to detect spoofing. The method 600 trains a machine learning model to both detect spoofing and to perform a biometric measurement, instead of relying on a biometric verification engine 318 to perform a biometric verification analysis. The method 600 can train a single machine learning model to do both because it has access to the polarization information.

There are benefits and drawbacks to both of the methods in comparison to each other: method 400 is simpler and utilizes fewer computing resources than method 600, which processes a larger amount of data. Method 400 also allows the biometric analysis computing device 302 to use a previously developed biometric verification engine 318, such that the machine learning model can simply augment the capabilities of an existing system with anti-spoofing capabilities. Method 600, on the other hand, allows for a one-step verification process at the biometric analysis computing device 302, thus allowing for less complexity at the biometric analysis computing device 302 compared to using separate steps for anti-spoofing and biometric verification.

From a start block, the method 600 proceeds to block 602, where a training example collection engine 326 of a model training computing device 304 receives a plurality of images of a valid subject from a biometric analysis computing device 302, each image at least including polarization information and two-dimensional image information. As above, the "valid subject" is a subject of a biometric measurement that is not being spoofed. The polarization information again includes, in some embodiments, AoLP information and DoLP information. In some embodiments, the polarization information may include just one of the AoLP information or the DoLP information. In some embodiments, the polarization information may include the $S_0$, $S_1$, and $S_2$ information. In some embodiments, the polarization information may include surface normal information. In some embodiments, each of the plurality of images is of the same valid subject, because the machine learning model will be used to perform the biometric measurement of the subject.

At block 604, the training example collection engine 326 stores the plurality of images of the valid subject in a set of training examples. As above, the set of training examples may be stored in the model data store 322, or in another data store. The images may be stored in the set of training examples along with an indication that the images are valid/not spoofed, and/or an indication of the identity of the subject. In some embodiments, the training example collection engine 326 may detect a location of a face (or other feature to be measured) in the image, and may limit the stored information to the location of the face in order to reduce processing and storage costs.

At block 606, the training example collection engine 326 receives a plurality of images of a spoofed subject from the biometric analysis computing device 302, each image including two-dimensional image information and polarization information. The types of polarization information are similar to the polarization information collected in block 602. Again, the "spoofed subject" is an attempt to appear to be a valid subject of a biometric measurement, when in reality the valid subject is not present. The training examples collected in block 606 may be collected from different spoofed subjects, and/or multiple training examples may be collected from the same spoofed subject.

At block 608, the training example collection engine 326 stores the plurality of images of the spoofed subject in the set of training examples. The images of the spoofed subject may be stored in the set of training examples along with an indication that the images are not valid/are spoofed, and/or an indication of the identity of the spoofed subject. Again, the training example collection engine 326 may detect a location of the feature (e.g., a face) to be measured in the image, and may limit the stored information to the location of the feature.

At block 610, a model training engine 324 of the biometric analysis computing device 302 trains a machine learning model to determine whether images represent the subject and are not spoofed using the set of training examples. As above, any suitable type of machine learning model or combinations of types of models may be used, including but not limited to an SVM, a decision tree, or a convolutional neural network. Further, any suitable technique or combinations of techniques may be used to train the machine learning model, including but not limited to gradient descent and backpropagation. The inputs to the machine learning model are the polarization information and the two-dimensional image information stored in the training examples, and the spoofed/valid indications and the identity of the subject are used as the expected output values. In some embodiments, the trained machine learning model receives the polarization information and the two-dimensional image information as input, and generates an output that indicates whether the polarization information represents a valid subject or a spoofed subject, and whether the two-dimensional image information represents a given subject. In some embodiments, the output may indicate which subject of a plurality of subjects the image information represents. In some embodiments, the output includes discrete values for the valid/spoofed subject and for the identity of the subject. In some embodiments, the output may include confidence values or other percentages that may then be compared to confidence thresholds in order to determine whether the polarization information represents a valid subject or a spoofed subject, and to determine the identity of the subject.

At block 612, the model training engine 324 stores the machine learning model in a model data store 322 of the model training computing device 304. At optional block 614, the model training engine 324 transmits the machine learning model to the biometric analysis computing device 302. Optional block 614 is illustrated as optional because in some embodiments, the biometric analysis computing device 302 may obtain the machine learning model using some other technique, or the machine learning model may be retained on the model training computing device 304 in order to perform analyses on the model training computing device 304.

The method 600 then proceeds to an end block and terminates. One will note that the order in which the blocks of method 600 are illustrated is an example only, and that in some embodiments, some of the blocks may be executed in a different order, or in parallel. For example, in some embodiments, the actions described with respect to blocks 602 and 604 may occur after or concurrently with the actions described with respect to blocks 606 and 608.

Figure 7:
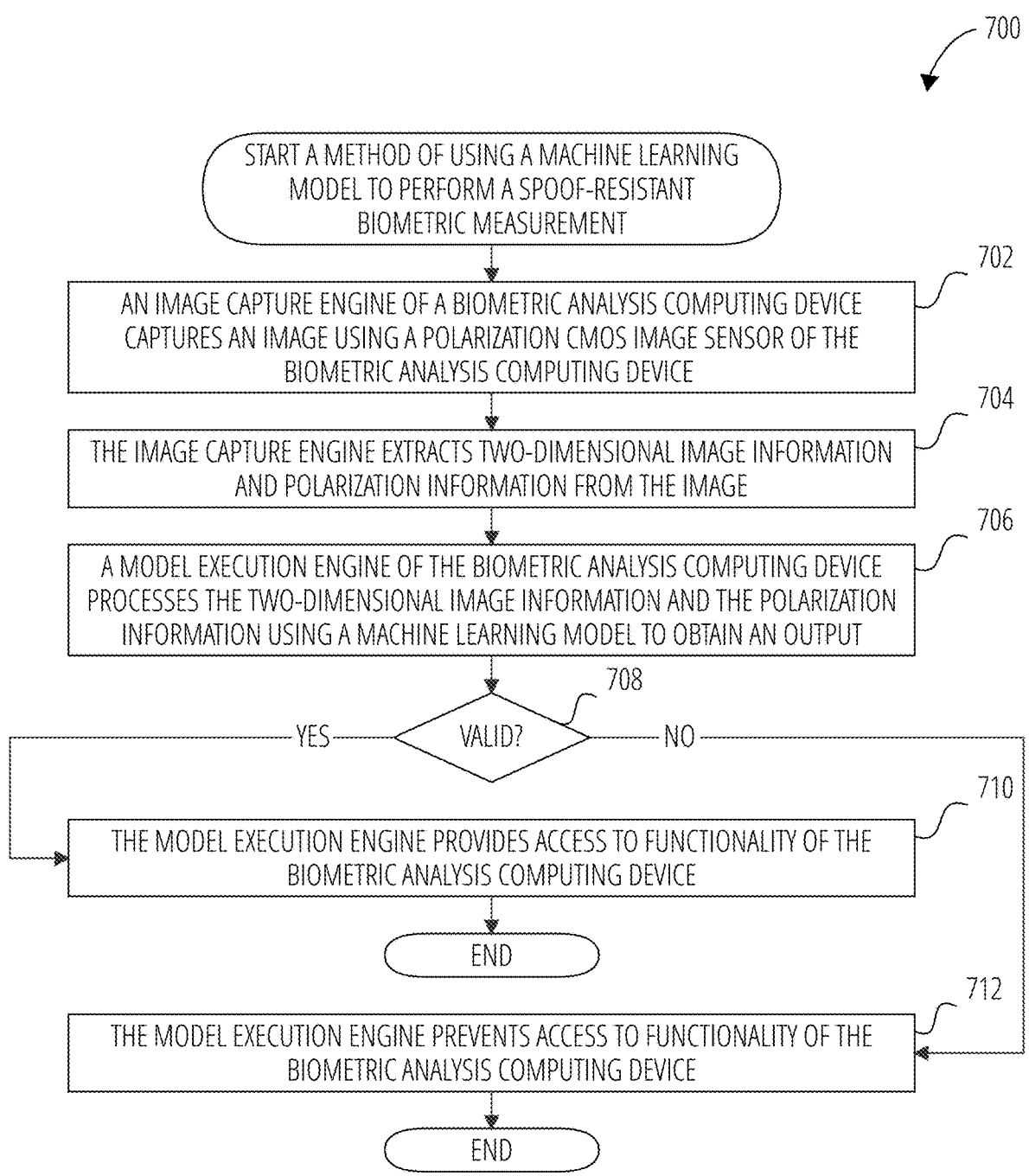
FIG. 7 is a flowchart that illustrates a non-limiting example embodiment of a method of using a machine learning model to perform a spoof-resistant biometric measurement according to various aspects of the present disclosure.

FIG. 7 is a flowchart that illustrates a non-limiting example embodiment of a method of using a machine learning model to perform a spoof-resistant biometric measurement according to various aspects of the present disclosure. The method 700 uses a machine learning model such as the machine learning model trained in method 600 as discussed above. Similar to the method 500 discussed above, the method 700 may be used for any reason a biometric verification may be used, including but not limited to providing access to functionality of the biometric analysis computing device 302. Unlike the method 500 discussed above, the method 700 does not use a biometric verification engine 318 to perform the biometric verification analysis, but instead uses the machine learning model trained by the method 600 to both detect spoofing and to determine whether an expected subject is represented by the image collected by the polarization CMOS image sensor 308.

From a start block, the method 700 proceeds to block 702, where an image capture engine 314 of a biometric analysis computing device 302 captures an image using a polarization CMOS image sensor 308 of the biometric analysis computing device 302. At block 704, the image capture engine 314 extracts two-dimensional image information and polarization information from the image. As discussed above, the polarization information may include AoLP information and DoLP information, and the polarization information may correspond to the two-dimensional image information. In some embodiments, the image capture engine 314 may detect the presence of a face in the two-dimensional image information, and may limit further processing to the locations within the image that include the face in order to reduce memory and processing cost.

At block 706, a model execution engine 316 of the biometric analysis computing device 302 processes the two-dimensional image information and the polarization information using a machine learning model to obtain an output. The machine learning model is a machine learning model such as those trained by method 600 discussed above. The input to the machine learning model is the polarization information and the two-dimensional image information (or portions thereof that correspond to a detected face or other feature to be measured), and the output of the machine learning model are Boolean values, other discrete values, or confidence percentages that indicate whether or not the input indicates a valid subject and whether or not an expected subject is indicated.

At decision block 708, a determination is made regarding whether the output of the machine learning model indicates that the image represents a valid biometric measurement, and that the biometric measurement matches an expected biometric measurement. In some embodiments, the determination may simply consider the Boolean or other discrete values of the output. In some embodiments, the determination may compare confidence percentages to threshold percentages to determine whether the subject is valid and/or the identity of the subject is confirmed.

If the determination is that the output does indicate that the image represents a valid and expected biometric measurement, then the result of decision block 708 is YES, and the method 700 proceeds to block 710, where the model execution engine 316 provides access to functionality of the biometric analysis computing device 302. The method 700 then proceeds to an end block and terminates.

Returning to decision block 708, if the determination is that the output either indicates that the image does not represent a valid biometric measurement or that the biometric measurement is valid but unexpected, then the result of decision block 708 is NO, and the method 700 proceeds to block 712, where the model execution engine 316 prevents access to the functionality of the biometric analysis computing device 302. The method 700 then proceeds to an end block and terminates.

Figure 8:
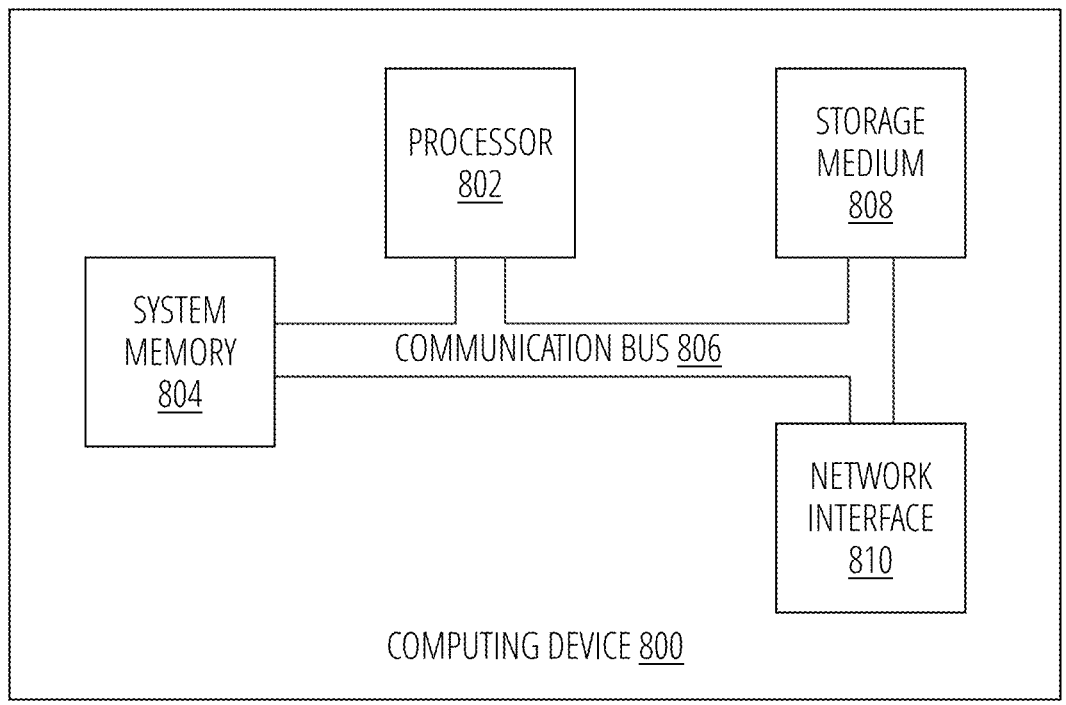
FIG. 8 is a block diagram that illustrates a non-limiting example embodiment of a computing device appropriate for use as a computing device with embodiments of the present disclosure.

FIG. 8 is a block diagram that illustrates aspects of an exemplary computing device 800 appropriate for use as a computing device of the present disclosure. While multiple different types of computing devices were discussed above, the exemplary computing device 800 describes various elements that are common to many different types of computing devices. While FIG. 8 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Some embodiments of a computing device may be implemented in or may include an application-specific integrated circuit (ASIC), a field-programmable gate array (FPGA), or other customized device. Moreover, those of ordinary skill in the art and others will recognize that the computing device 800 may be any one of any number of currently available or yet to be developed devices.

In its most basic configuration, the computing device 800 includes at least one processor 802 and a system memory 804 connected by a communication bus 806. Depending on the exact configuration and type of device, the system memory 804 may be volatile or nonvolatile memory, such as read only memory ("ROM"), random access memory ("RAM"), EEPROM, flash memory, or similar memory technology. Those of ordinary skill in the art and others will recognize that system memory 804 typically stores data and/or program modules that are immediately accessible to and/or currently being operated on by the processor 802. In this regard, the processor 802 may serve as a computational center of the computing device 800 by supporting the execution of instructions.

As further illustrated in FIG. 8, the computing device 800 may include a network interface 810 comprising one or more components for communicating with other devices over a network. Embodiments of the present disclosure may access basic services that utilize the network interface 810 to perform communications using common network protocols. The network interface 810 may also include a wireless network interface configured to communicate via one or more wireless communication protocols, such as Wi-Fi, 2G, 3G, LTE, WiMAX, Bluetooth, Bluetooth low energy, and/or the like. As will be appreciated by one of ordinary skill in the art, the network interface 810 illustrated in FIG. 8 may represent one or more wireless interfaces or physical communication interfaces described and illustrated above with respect to particular components of the computing device 800.

In the exemplary embodiment depicted in FIG. 8, the computing device 800 also includes a storage medium 808. However, services may be accessed using a computing device that does not include means for persisting data to a local storage medium. Therefore, the storage medium 808 depicted in FIG. 8 is represented with a dashed line to indicate that the storage medium 808 is optional. In any event, the storage medium 808 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

Suitable implementations of computing devices that include a processor 802, system memory 804, communication bus 806, storage medium 808, and network interface 810 are known and commercially available. For ease of illustration and because it is not important for an understanding of the claimed subject matter, FIG. 8 does not show some of the typical components of many computing devices. In this regard, the computing device 800 may include input devices, such as a keyboard, keypad, mouse, microphone, touch input device, touch screen, tablet, and/or the like. Such input devices may be coupled to the computing device 800 by wired or wireless connections including RF, infrared, serial, parallel, Bluetooth, Bluetooth low energy, USB, or other suitable connections protocols using wireless or physical connections. Similarly, the computing device 800 may also include output devices such as a display, speakers, printer, etc. Since these devices are well known in the art, they are not illustrated or described further herein.

While the preferred embodiment of the invention has been illustrated and described, it will be appreciated that various changes can be made therein without departing from the spirit and scope of the invention. Thus, the above description of illustrated examples of the present invention, including what is described in the Abstract, are not intended to be exhaustive or to be a limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A system, comprising:
    a polarization CMOS image sensor;
    at least one processor; and
    a non-transitory computer-readable medium having computer-executable instructions stored thereon that, in response to execution by the at least one processor, cause the system to perform actions comprising:
        receiving, from the polarization CMOS image sensor, polarization information and two-dimensional image information; and
        processing the polarization information using a machine learning model to generate an output that indicates whether the polarization information represents a valid biometric measurement of a physical feature of a subject;
    wherein processing the polarization information using a machine learning model includes processing the polarization information and the two-dimensional image information using the machine learning model, and
    wherein the output includes an indication of whether a biometric measurement associated with the two-dimensional image information and the polarization information represents the physical feature of the subject and an indication of whether the two-dimensional image information and the polarization information represents a valid biometric measurement of the physical feature of the subject.

2. The system of claim 1, wherein receiving polarization information and two-dimensional image information from the polarization CMOS image sensor includes:
    receiving a two-dimensional image; and
    receiving at least one of:
        angle of linear polarization (AoLP) information that corresponds to the two-dimensional image;
        degree of linear polarization (DoLP) information that corresponds to the two-dimensional image;
        S0, S1, and S2 information that corresponds to the two-dimensional image; and
        surface normals that correspond to the two-dimensional image.

3. The system of claim 1, wherein the actions further comprise:
    in response to determining that the output indicates that the polarization information represents a valid biometric measurement of the physical feature of the subject: performing a biometric verification analysis using the two-dimensional image information.

4. The system of claim 3, wherein performing the biometric verification analysis using the two-dimensional image information includes performing a facial recognition analysis using the two-dimensional image information.

5. The system of claim 1, wherein the machine learning model is a support vector model (SVM), a decision tree, or a convolutional neural network.

6. A non-transitory computer-readable medium having computer-executable instructions stored thereon that, in response to execution by one or more processors of a computing system, cause the computing system to perform actions for training a machine learning model to verify a biometric measurement of a physical feature of a subject, the actions comprising:
    collecting, by the computing system, a set of training examples, wherein collecting each training example includes receiving polarization information, two-dimensional image information, and an indication of whether the subject is spoofed in the training example; and
    training, by the computing system, the machine learning model to verify biometric measurements using the set of training examples;
    wherein training the machine learning model to verify biometric measurements using the set of training examples includes, for each training example of the set of training examples, using the indication of whether the subject is spoofed in the training example as an expected output of the machine learning model for the training example.

7. The non-transitory computer-readable medium of claim 6, wherein receiving polarization information and two-dimensional image information includes:
    receiving a two-dimensional image; and
    receiving at least one of:
        angle of linear polarization (AoLP) information that corresponds to the two-dimensional image;
        degree of linear polarization (DoLP) information that corresponds to the two-dimensional image;
        S0, S1, and S2 information that corresponds to the two-dimensional image; and
        surface normals that correspond to the two-dimensional image.

8. The non-transitory computer-readable medium of claim 6, wherein collecting the set of training examples includes:
    collecting training examples that include polarization information and two-dimensional image information based on the physical feature of the subject; and
    collecting training examples that include polarization information and two-dimensional image information based on a spoofed depiction of the physical feature of the subject.

9. The non-transitory computer-readable medium of claim 8, wherein training the machine learning model to verify biometric measurements using the set of training examples includes, for each training example of the set of training examples, using the two-dimensional image and the polarization information as input to the machine learning model for the training example.

10. The non-transitory computer-readable medium of claim 8, wherein collecting the set of training examples includes:

collecting training examples that include polarization information and two-dimensional image information based on a physical feature of a second subject other than the subject; and including an indication of whether the training example is based on the subject.

11. The non-transitory computer-readable medium of claim 6, wherein training the machine learning model to verify biometric measurements using the set of training examples includes, for each training example, using the indication of whether the training example is based on the subject as an expected output of the machine learning model for the training example.

12. The non-transitory computer-readable medium of claim 6, wherein training the machine learning model includes training a support vector model (SVM), a decision tree, or convolutional neural network.

13. A non-transitory computer-readable medium having computer-executable instructions stored thereon that, in response to execution by one or more processors of a computing system, cause the computing system to perform actions for training a machine learning model to validate a biometric measurement, the actions comprising:

collecting, by the computing system, a set of training examples, wherein collecting each training example includes receiving polarization information, two-dimensional image information, and an indication of whether a subject is spoofed in the training example; and training, by the computing system, the machine learning model to verify whether biometric measurements are spoofed using the set of training examples;

wherein training the machine learning model to verify whether biometric measurements are spoofed using the set of training examples includes, for each training example of the set of training examples, using the indication of whether the subject is spoofed in the training example as an expected output of the machine learning model for the training example.

14. The non-transitory computer-readable medium of claim 13, wherein receiving polarization information includes receiving at least one of:

angle of linear polarization (AoLP) information;
degree of linear polarization (DoLP) information;
S0, S1, and S2 information; and
surface normals.

15. The non-transitory computer-readable medium of claim 14, wherein training the machine learning model to verify whether biometric measurements are spoofed using the set of training examples includes:

for each training example of the set of training examples, using the polarization information as input to the machine learning model for the training example.

16. The non-transitory computer-readable medium of claim 14, wherein collecting each training example further includes receiving a two-dimensional image, and wherein the polarization information corresponds to the two-dimensional image.

17. The non-transitory computer-readable medium of claim 16, wherein receiving a two-dimensional image includes receiving a two-dimensional image that is usable for performing a biometric measurement.

18. The non-transitory computer-readable medium of claim 13, wherein collecting the set of training examples includes:

collecting training examples that include polarization information based on the physical feature of the subject; and collecting training examples that include polarization information based on a spoofed depiction of the physical feature of the subject.

* * * * *